United States Patent
De Magistris et al.

(10) Patent No.: US 11,823,039 B2
(45) Date of Patent: Nov. 21, 2023

(54) SAFE AND FAST EXPLORATION FOR REINFORCEMENT LEARNING USING CONSTRAINED ACTION MANIFOLDS

(71) Applicant: INTERNATIONAL BUSINESS MACHINES CORPORATION, Armonk, NY (US)

(72) Inventors: Giovanni De Magistris, Tokyo (JP); Tu-Hoa Pham, Tokyo (JP); Asim Munawar, Ichikawa (JP); Ryuki Tachibana, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1354 days.

(21) Appl. No.: 16/112,076

(22) Filed: Aug. 24, 2018

(65) Prior Publication Data
US 2020/0065666 A1    Feb. 27, 2020

(51) Int. Cl.
*G06N 3/08*    (2023.01)
*G06N 3/04*    (2023.01)

(52) U.S. Cl.
CPC .............. *G06N 3/08* (2013.01); *G06N 3/04* (2013.01)

(58) Field of Classification Search
CPC ............ G06N 20/00; G06N 3/08; G06N 3/04
See application file for complete search history.

(56) References Cited

U.S. PATENT DOCUMENTS

| | | |
|---|---|---|
| 8,494,980 B2 | 7/2013 | Hans et al. |
| 9,613,310 B2 | 4/2017 | Buibas et al. |
| 2013/0325776 A1 | 12/2013 | Ponulak et al. |
| 2017/0032245 A1 | 2/2017 | Osband et al. |
| 2018/0009445 A1 | 1/2018 | Nishi |

FOREIGN PATENT DOCUMENTS

WO    WO2018053187    3/2018

OTHER PUBLICATIONS

Li et al., 2018 "Safe Reinforcement Learning: Learning with Supervision Using a Constraint-Admissible Set" Jan. 3, 2017, Retrieved from the internet <URL:https://ieeexplore.ieee.org/abstract/document/8430770> (Year: 2018).*

(Continued)

*Primary Examiner* — Brian M Smith
(74) *Attorney, Agent, or Firm* — Tutunjian & Bitetto, P.C.; Robert Richard Aragona

(57) ABSTRACT

According to an aspect of the present invention, a computer-implemented method is provided for reinforcement learning. The method includes reading, by a processor device, an action manifold which is described as a n-polytope, at least one physical action limit, and at least one safety constraint. The method further includes updating, by the processor device, the action manifold based on the at least one physical action limit and the at least one safety constraint. The method also includes performing, by the processor device, the reinforcement learning by selecting a constrained action from among a set of constrained actions in the action manifold.

17 Claims, 10 Drawing Sheets

(56) References Cited

OTHER PUBLICATIONS

Berglund et al., 2010 "Planning Smooth and Obstacle-Avoiding B-Spline Paths for Autonomous Mining Vehicles" Jan. 3, 2017, Retrieved om the internet <URL:https://ieeexplore.ieee.org/document/4982555> (Year: 2010).*

Marie, J., 2016 "Projection onto a plane" Jan. 3, 2017, Retrieved from the internet <URL:https://ieeexplore.ieee.org/abstract/document/8430770> (Year: 2016).*

Achiam et al., "Constrained Policy Optimization", Proceedings of the 34th International Conference on Machine Learning, Aug. 2017, 18 pages.

Chow et al., "Risk-Constrained Reinforcement Learning with Percentile Risk Criteria", arXiv.org > cs > arXiv:1512.01629v3, Apr. 2017, pp. 1-49.

Escande, et al., "Hierarchical Quadratic Programming: Fast Online Humanoid-Robot Motion Generation", The International Journal of Robotics Research, sage, May 2014, pp. 1006-1028.

Garcia et al., "A Comprehensive Survey on Safe Reinforcement Learning", The Journal of Machine Learning Research Archive, Jan. 2015 pp. 1437-1480 vol. 16 Issue 1.

Hans et al., "Safe Exploration for Reinforcement Learning", Conference: Conference: ESANN 2008, 16th European Symposium on Artificial Neural Networks, Apr. 2008, 9 pages.

Garcia et al., "Safe Exploration of State and Action Spaces in Reinforcement Learning", Journal of Articial Intelligence Research Dec. 2012, pp. 516-564.

Mnih et al., "Human-level control through deep reinforcement learning", Nature, Feb. 2015, 13 Pages.

Pham et al., "OptLayer—Practical Constrained Optimization for Deep Reinforcement Learning in the Real World", arXiv:1709.07643v2 [cs.RO] Feb. 23, 2018, 8 pages.

Schulman et al., "Trust Region Policy Optimization", Proceedings of the 31 st International Conference on Machine Learning, Jul. 2015, 16 pages.

* cited by examiner

SAFE AND FAST EXPLORATION FOR REINFORCEMENT LEARNING USING CONSTRAINED ACTION MANIFOLDS

BACKGROUND

Technical Field

The present invention generally relates to machine learning, and more particularly to safe and fast exploration for reinforcement learning using constrained action manifolds.

Description of the Related Art

It is desirable to acquire complex skills without explicit programming. Such skill acquisition can be used for multiple applications such as, for example, decision-making, robotics, Internet of Things (IoT), and so forth. Moreover, Artificial Intelligence (AI) can often outperform humans or hardcoded policies. However, existing limitations of AI techniques (e.g., Reinforcement Learning (RL), Supervised Learning (SL), and so forth) include time and data requirements. For example, while RL allows learning from trial and error, exploration to discover new strategies is time-consuming. Moreover, while SL enables fast training from expert demonstrations, SL needs many examples covering state and action spaces. Hence, it is desirable to restrict exploration during reinforcement learning in order to be safe, that is, only perform safe actions.

SUMMARY

According to an aspect of the present invention, a computer-implemented method is provided for reinforcement learning. The method includes reading, by a processor device, an action manifold which is described as a n-polytope, at least one physical action limit, and at least one safety constraint. The method further includes updating, by the processor device, the action manifold based on the at least one physical action limit and the at least one safety constraint. The method also includes performing, by the processor device, the reinforcement learning by selecting a constrained action from among a set of constrained actions in the action manifold.

According to another aspect of the present invention, a computer program product is provided for reinforcement learning. The computer program product includes a non-transitory computer readable storage medium having program instructions embodied therewith. The program instructions are executable by a computer to cause the computer to perform a method. The method includes reading, by a processor device, an action manifold which is described as a n-polytope, at least one physical action limit, and at least one safety constraint. The method further includes updating, by the processor device, the action manifold based on the at least one physical action limit and the at least one safety constraint. The method also includes performing, by the processor device, the reinforcement learning by selecting a constrained action from among a set of constrained actions in the action manifold.

According to yet another aspect of the present invention, a computer processing system is provided for reinforcement learning. The computer processing system includes a memory for storing program code. The computer processing system further includes a processor device operatively coupled to the memory for running the program code to read an action manifold which is described as a n-polytope, at least one physical action limit, and at least one safety constraint. The processor device further runs the program code to update the action manifold based on the at least one physical action limit and the at least one safety constraint. The processor device also runs the program code to perform the reinforcement learning by selecting a constrained action from among a set of constrained actions in the action manifold.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to safe and fast exploration for reinforcement learning using constrained action manifolds.

As compared to prior art approaches, the present invention can advantageously (i) provide a higher reward, (ii) perform less episodes and time steps (e.g., quicker convergence), (iii) operate more safely (e.g., no collisions, and so forth), and (iv) solve more problems (e.g., solve a complex maze, and so forth). These and other advantages of the present invention are readily determined by one of ordinary skill in the art given the teachings of the present invention provide herein, while maintaining the spirit of the present invention.

Figure 1:
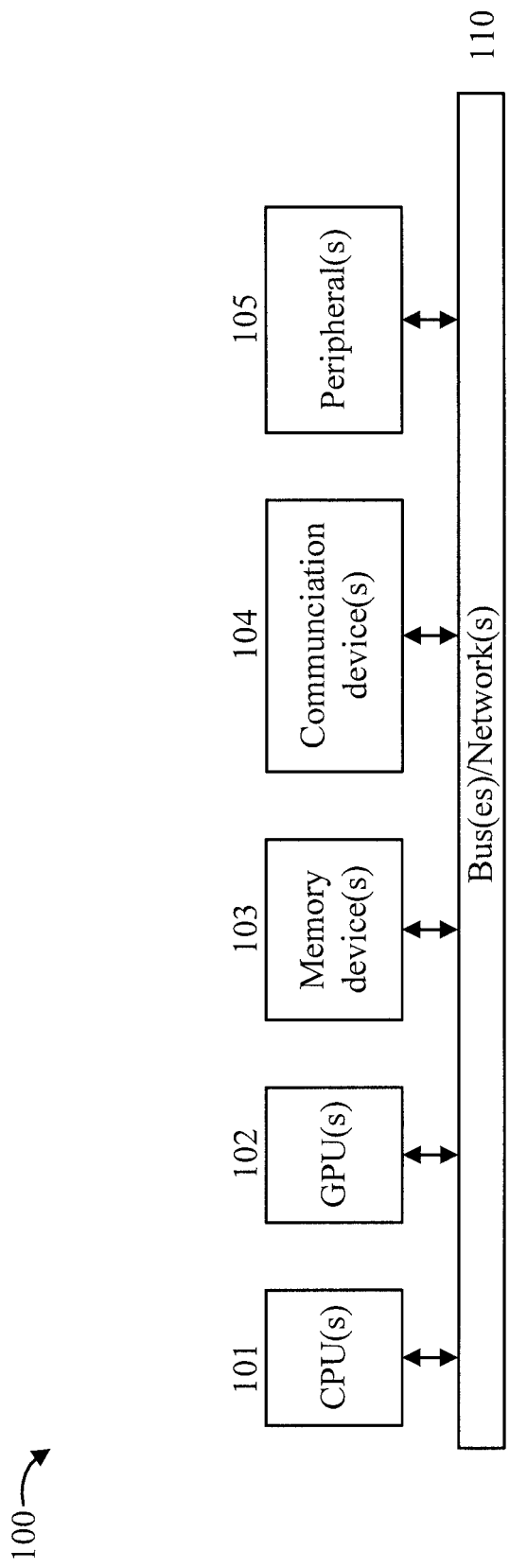
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 9-10). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
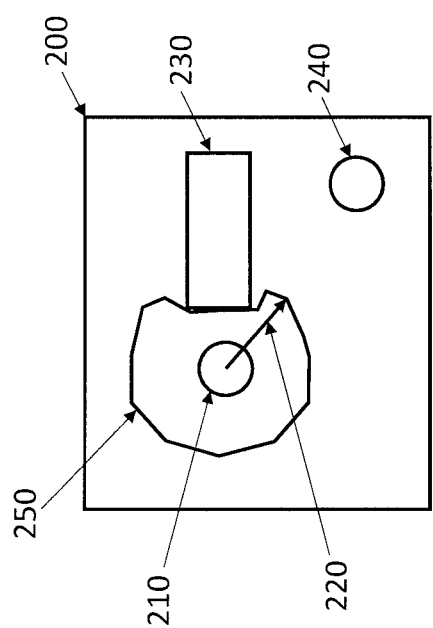
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment involves an agent 210, an agent action 220, an obstacle 230, a target 240, and a manifold 250. In an embodiment, a given action to be performed in the environment can include, for example, moving (agent action 220) the agent 210 to the target 240 while avoiding the obstacle 230.

Figure 3:
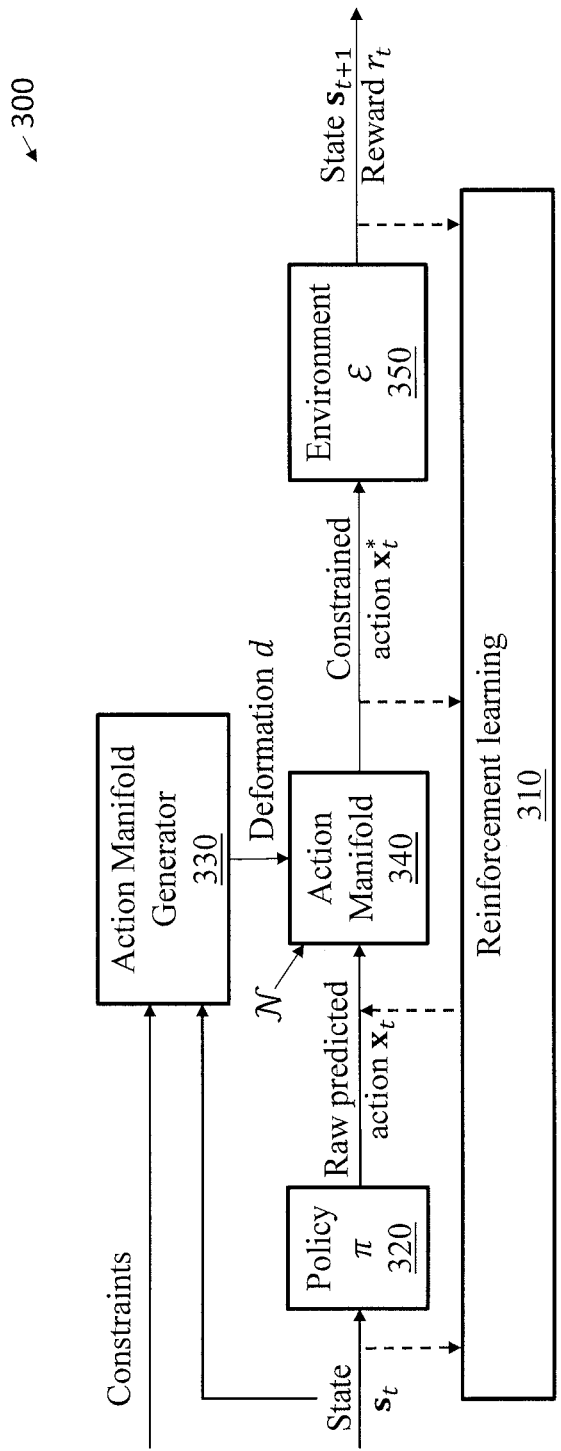
FIG. 3 is a block diagram showing an exemplary system to which the present invention can be applied, in accordance with an embodiment of the present invention.

FIG. 3 is a block diagram showing an exemplary system 300 to which the present invention can be applied, in accordance with an embodiment of the present invention. In an embodiment, one or more of the elements of system 300 can be implemented by one or more of the elements of system 100.

The system 300 includes a reinforcement learning element 310, a policy element π 320, an action manifold generator 330, an action manifold Ω 340, and an environment ε 350.

The policy element π 320 inputs a state $s_t$, and outputs a raw prediction action $x_t$.

The action manifold generator 330 inputs constraints and the state $s_t$, and outputs a deformation d.

The action manifold 340 which, in an embodiment, can be implemented using a neural network N, inputs the raw predicted action $x_t$ and the deformation d, and outputs a constrained action $x_t^*$.

The environment ε 350 inputs the constrained action $x_t^*$, and outputs a state $s_{t+1}$ and reward $r_t$.

The reinforcement learning element 310 interfaces with the other elements of system 300 to implement a reinforcement learning process thereon in order to obtain a given reward(s) responsive to a given action(s) being performed by an agent(s) in an environment(s). The reinforcement learning element 310 is configured to perform safe and fast exploration using the (constrained) action manifold 340. Moreover, improved exploration as provided by the present invention also results in improved exploitation in RL. Here, for the sake of illustration, a single policy element (which may include a set of various policies), agent and environment are shown. In other embodiments, other numbers of policies, agents and environments can be used, while maintaining the spirit of the present invention. These and other variations of system 300 are readily determined by one of ordinary skill in the art, given the teachings of the present invention provided herein, while maintaining the spirit of the present invention.

Figure 4:
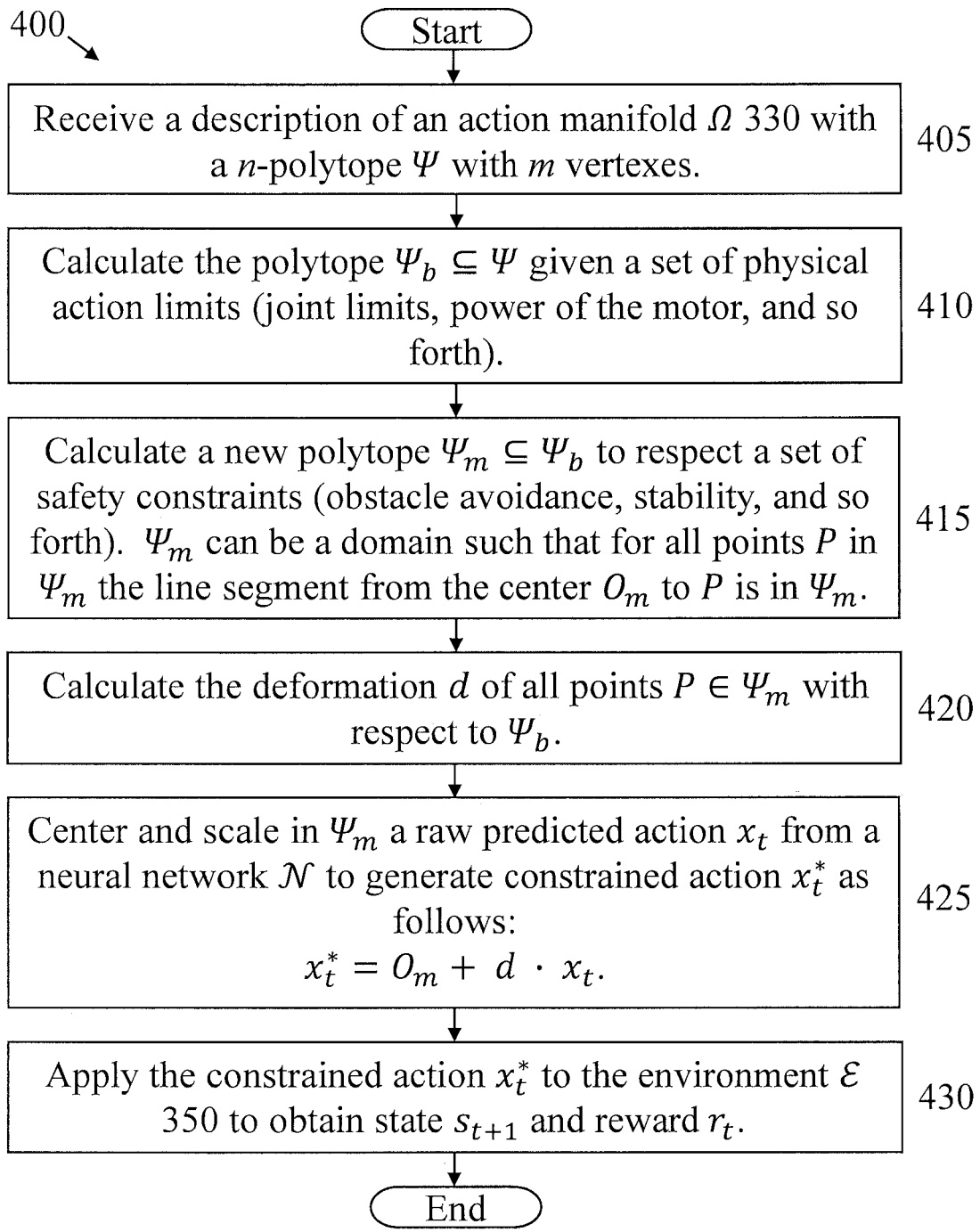
FIG. 4 is a flow diagram showing an exemplary method for safe and fast exploration for reinforcement learning using constrained action manifolds, in accordance with an embodiment of the present invention.

FIG. 4 is a flow diagram showing an exemplary method 400 for safe and fast exploration for reinforcement learning using constrained action manifolds, in accordance with an embodiment of the present invention. In an embodiment, method 400 can be performed by system 200.

At block 405, receive a description of an action manifold Ω 330 with a n-polytope • with m vertexes. In an embodiment, this polytope can be defined by humans. In another embodiment, the polytope can be defined by a machine. The definition can be based on various factors including, but not limited to, features of the environment, features of the agent, and so forth.

At block 410, calculate the polytope $\Psi_b \subseteq \Psi$ given a set of physical action limits (joint limits, power of the motor, and so forth).

At block 415, calculate a new polytope $\Psi_m \subseteq \Psi_b$ to respect a set of safety constraints (obstacle avoidance, stability, and so forth). In an embodiment, $\Psi_m$ can be a domain such that for all points P in $\Psi_m$ the line segment from the center $O_m$ to P is in $\Psi_m$.

At block 420, calculate the deformation d of all points $P \in \Psi_m$ with respect to $\Psi_b$.

At block 425, center and scale in $\Psi_m$ a raw predicted action $x_t$ from a neural network N to generate constrained action $x_t^*$ as follows:

$$x_t^* = O_m + d \cdot x_t.$$

The raw predicted action in block 425 optimizes the path of the agent 210, the centering performed allows the path of the agent 210 in the action manifold to avoid obstacles, while the scaling allows exploration of the action manifold.

At block 430, apply the constrained action $x_t^*$ to the environment ε 350 to obtain state $s_{t+1}$ and reward $r_t$.

Figure 5:
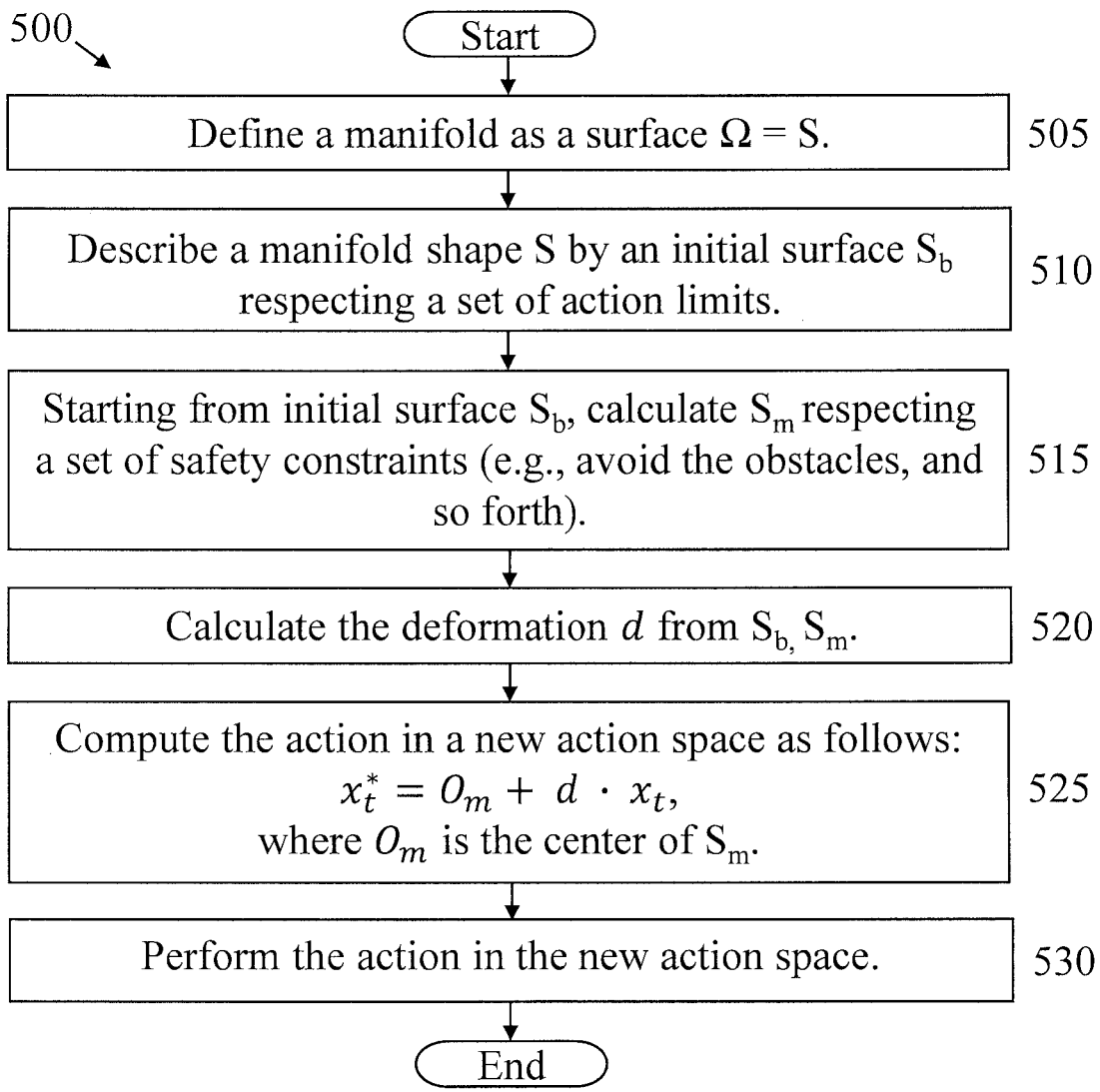
FIG. 5 is a flow diagram showing another exemplary method for safe and fast exploration for reinforcement learning using constrained action manifolds, in accordance with an embodiment of the present invention.

FIG. 5 is a flow diagram showing another exemplary method 500 for safe and fast exploration for reinforcement learning using constrained action manifolds, in accordance with an embodiment of the present invention.

At block 505, define a manifold as a surface Ω=S.

At block 510, describe a manifold shape S by an initial surface $S_b$ respecting a set of action limits.

At block 515, starting from initial surface $S_b$, calculate $S_m$ respecting a set of safety constraints (e.g., avoid the obstacles, and so forth). Hence, $S_m$ is calculated as a variant of initial surface $S_b$, but modified in order to comply with the set of safety constraints.

At block 520, calculate the deformation d from $S_b$, $S_m$.

At block 525, compute the action in a new action space as follows:

$$x_t^* = O_m + d \cdot x_t,$$

where $O_m$ is the center of $S_m$.

At block 530, perform the action in the new action space.

It is to be appreciated that various exemplary safety constraints and physical action limits are described herein for the sake of illustration. However, other safety constraints and/or physical action limits can also be used, depending upon the implementation, as readily appreciated by one of ordinary skill in the art.

A description will now be given further regarding the deformation d, in accordance with an embodiment of the present invention.

In an embodiment, the deformation d is parameterized by a spline.

In an embodiment, to each node $X_i$ of the manifold with cartesian coordinates ($x_i$, $y_i$) in a frame attached to $O_b$ (the center of $S_b$), the polar coordinates ($r_i$, $\phi_i$) are associated with the following convention:

$$r_i = x_i^2 + y_i^2, \phi_i = a\tan 2(yi, xi)$$

Then, the coordinates of the node after deformation are as follows:

$$X'_i = d(c, \phi_i) X_i$$

We define p as a 1D B-spline with parameters c such that:

$$d(c, \phi) = \Sigma_{J=0}^{n_\emptyset} c_j N_j(\emptyset),$$

where $N_j$ are B-spline basis functions of degree d defined on [0,2π], and $n_\emptyset$ is defined by the user.

A description will now be given regarding calculating $S_m$ respecting a set of safety constraints (e.g., avoid the obstacles, and so forth).

In an embodiment, the constrained manifold to avoid obstacles is described by the following:

$$\underset{d}{\mathrm{argmin}}[-\mathrm{area}(d)], \text{(Objective)}$$

Subject to:

$(B_i - A_i) \cdot u_i \geq 0, i = 1, \ldots, m,$   (Inequality Constraints)

where m is the number of obstacle points, $B_i$ is the closest point of the obstacle and $A_i$ is the manifold point $d \geq 0.01,$   (Lower Bounds)

$d \leq 1$   (Upper Bounds)

The action is calculated respect to the new action manifold $x_t^* = O_m + d \cdot x_t$ (scaled center action).

A description will now be given regarding an manifold optimization, in accordance with an embodiment of the present invention.

Figure 6:
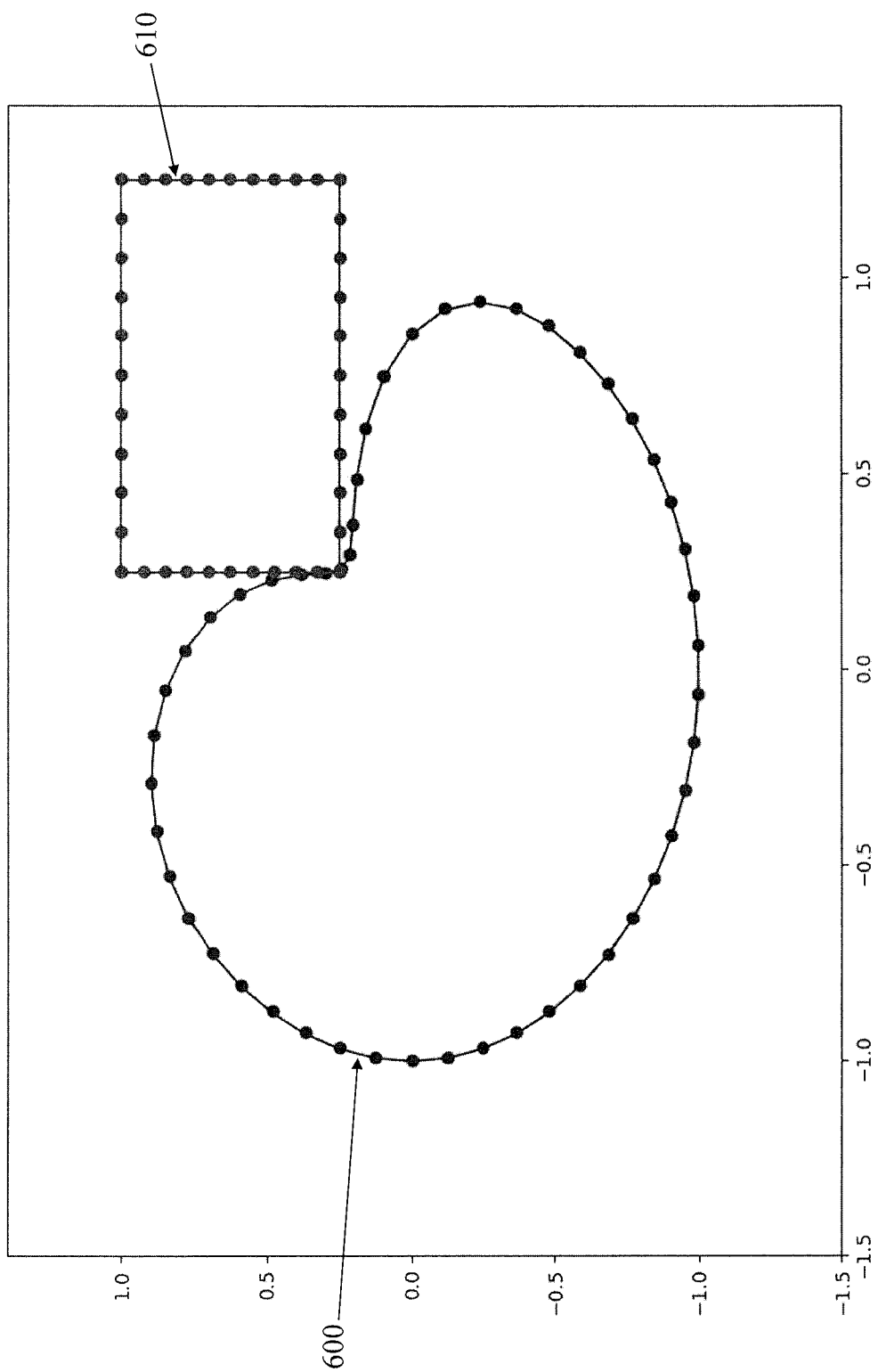
FIG. 6 is a plot showing an optimized manifold, in accordance with an embodiment of the present invention.
Figure 7:
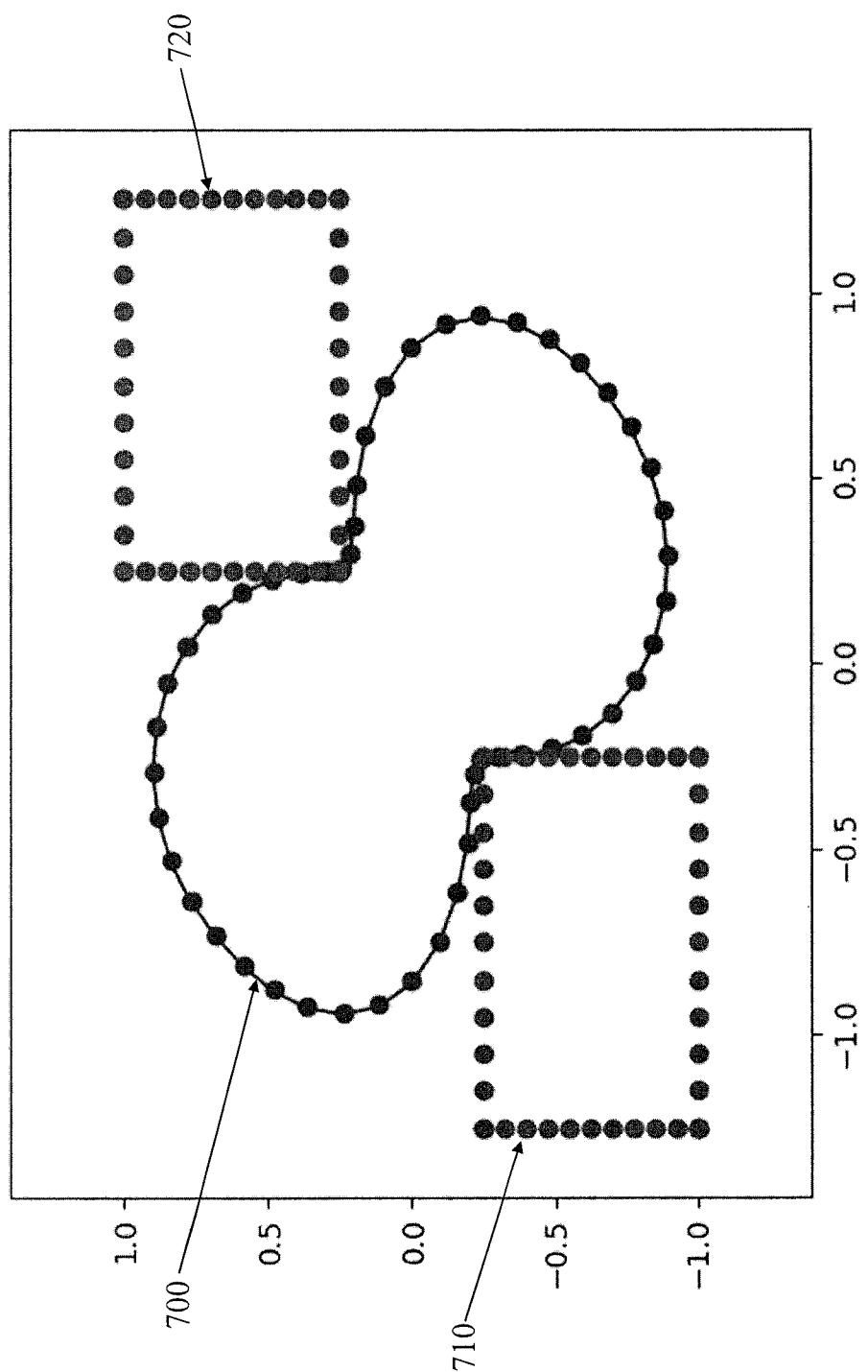
FIG. 7 is a plot showing another optimized manifold, in accordance with an embodiment of the present invention.

FIG. 6 is a plot showing an optimized manifold 600, in accordance with an embodiment of the present invention. FIG. 7 is a plot showing another optimized manifold 700, in accordance with an embodiment of the present invention. In particular, FIG. 6 shows a manifold 600 optimized with respect to a single obstacle 610, while FIG. 7 shows a manifold 700 optimized with respect to a first obstacle 710 and a second obstacle 720. The x-axis and the y-axis in both FIGS. 6 and 7 represent a distance measurement (with units not indicated, as any units can be used). As can be seen, the respective shapes of the manifolds 600 and 700 are optimized to avoid collisions with the obstacles 610 (in the case of manifold 600) and 710 and 720 (in the case of manifold 700).

Figure 8:
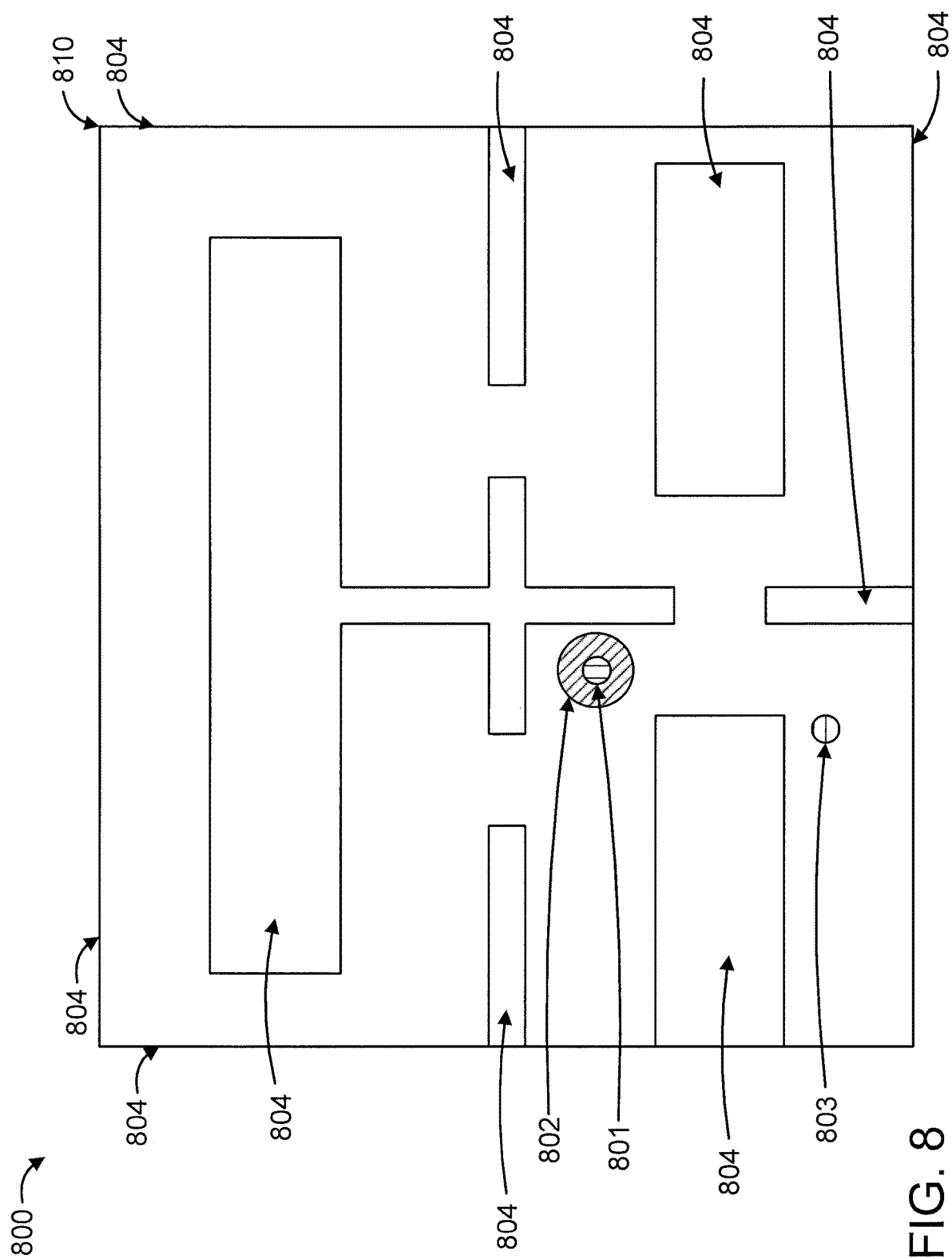
FIG. 8 shows another exemplary environment to which the present invention can be applied, in accordance with an embodiment of the present invention.

FIG. 8 shows another exemplary environment 800 to which the present invention can be applied, in accordance with an embodiment of the present invention.

The environment 800 involves an agent 810, a target 820, and a two-dimensional (2D) maze 830 having walls 830A with which the agent could potentially collide.

Regarding data collection, the following applies:
Circle with vertical hatching: agent 801.
Circle with horizontal hatching: target 802.
Circle with diagonal hatching: action manifold 803.
Various shapes: obstacles 804.

A description will now be given regarding some exemplary applications to which the present invention can be applied, in accordance with an embodiment of the present invention.

For example, the present invention can be used for robotics applications, a music recommendation system, factory management, garbage combustion, Advanced Driver Assistance Systems (ADAS), and so forth.

Further regarding robotics applications, the present invention can be applied to optimize balance, optimize maze solving, and so forth.

Further regarding a music recommendation system, the present invention can be used to minimize the user skipping songs, maximize the available and/or played "song variety", and so forth.

Further regarding factory management, the present invention can be used to keep production quality above a certain level, minimize energy costs, maximize worker happiness, and so forth.

Further regarding garbage combustion, the present invention can be used to maintain temperature at a certain level, minimize garbage segregation work, and so forth.

Further regarding ADAS, the present invention can be used to avoid collisions, control vehicle systems (e.g., in order to arrive at a target destination and/or to avoid collisions). The vehicle functions that can be controlled include, but are not limited to, acceleration, braking, steering, and so forth.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
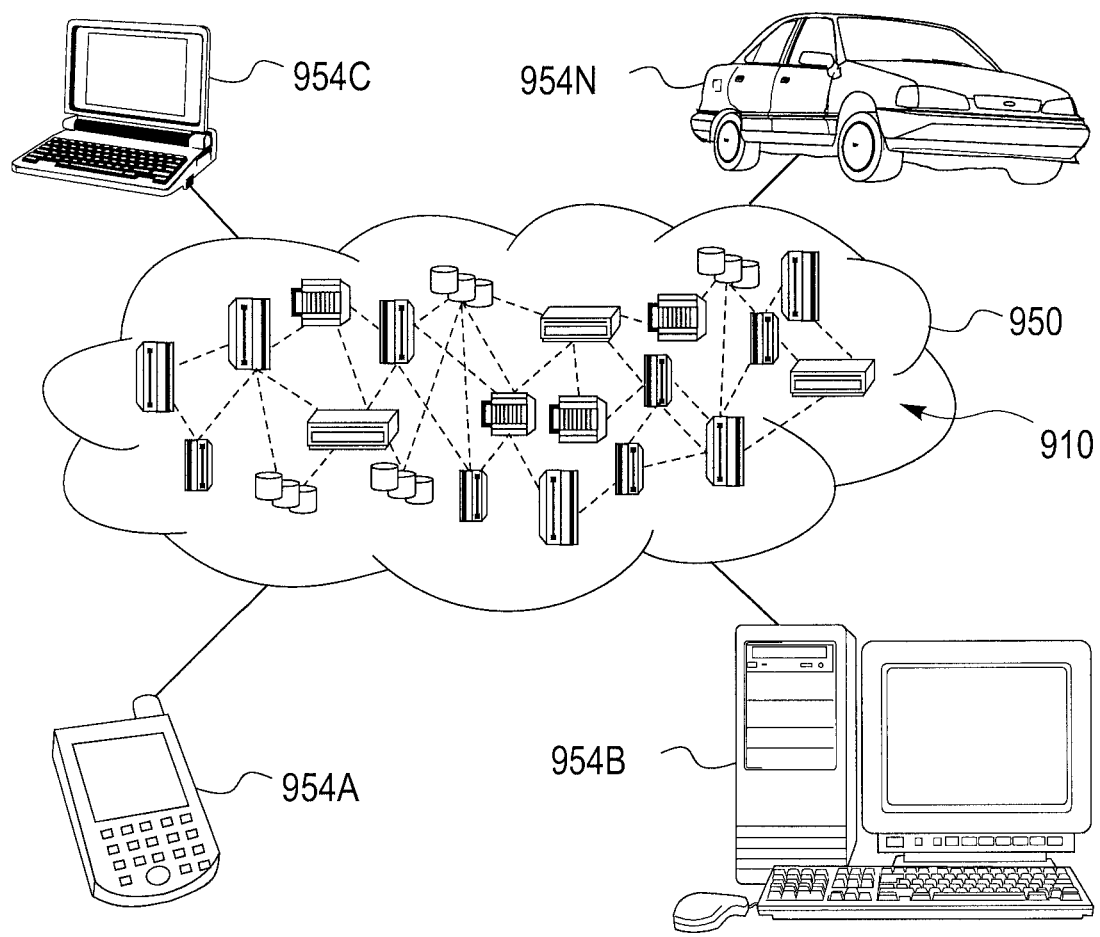
FIG. 9 is a block diagram showing an illustrative cloud computing environment having one or more cloud computing nodes with which local computing devices used by cloud consumers communicate in accordance with one embodiment.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
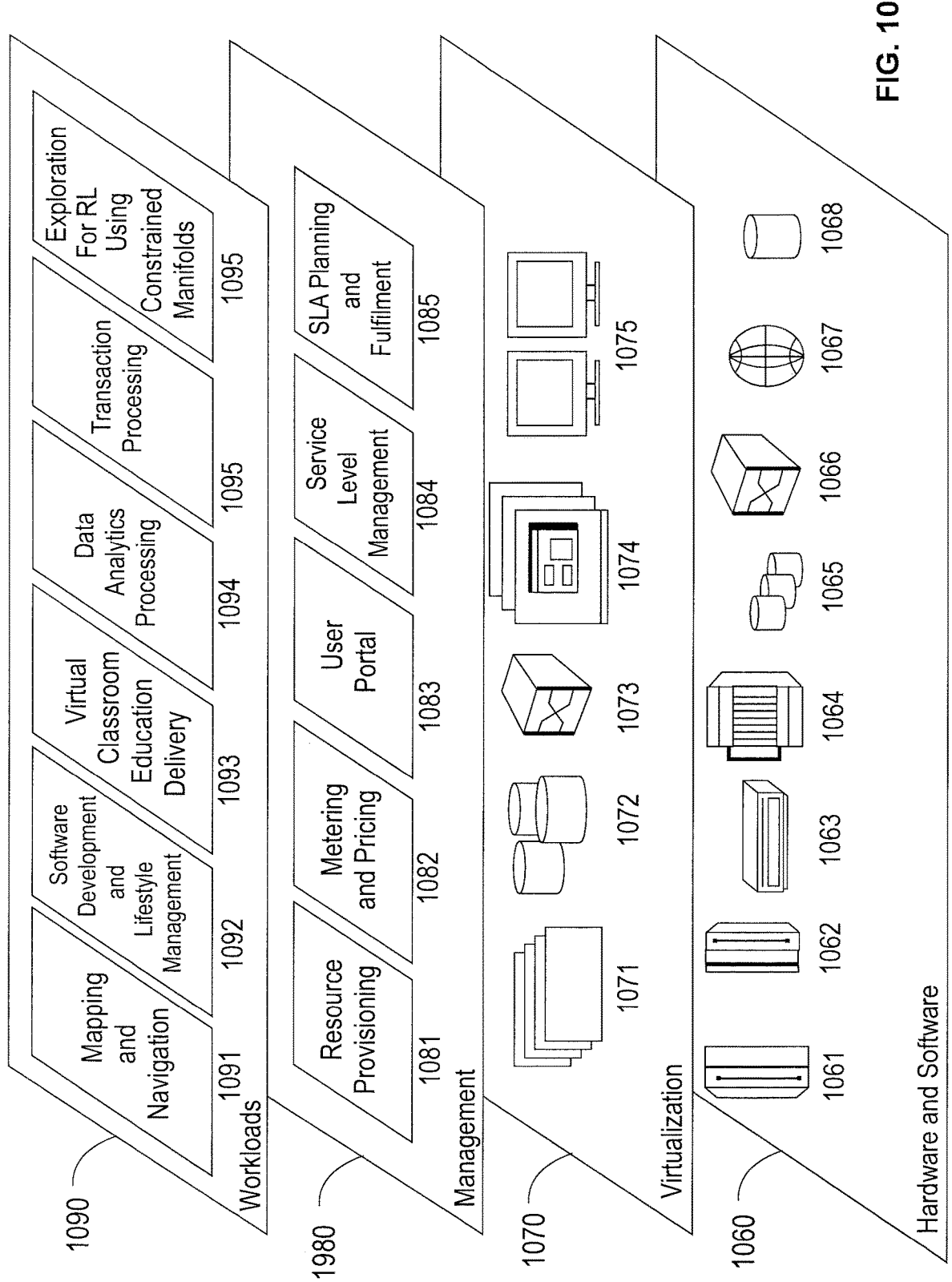
FIG. 10 is a block diagram showing a set of functional abstraction layers provided by a cloud computing environment in accordance with one embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and improved data matching accuracy based on context features 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for reinforcement learning, comprising:
    reading, by a processor device, an action manifold which is described as a n-polytope, at least one physical action limit, and at least one safety constraint;
    updating, by the processor device, the action manifold based on the at least one physical action limit;
    calculating, by the processor device, a new action manifold based on the at least one safety constraint; and
    performing, by the processor device, the reinforcement learning by selecting a constrained action from among a set of constrained actions in the new action manifold,
    wherein the constrained action is selected by centering and scaling a raw action predicted by a neural network in the new action manifold, the centering avoiding obstacles in an agent path in the new action manifold, the scaling exploring the new action manifold based on a deformation of the new action manifold relative to the updated action manifold and constrained by upper and lower bounds derived from the at least one physical action limit and the at least one safety constraint, and wherein the new action manifold inputs one or more constraints and a state and outputs the deformation.

2. The computer-implemented method of claim 1, further comprising defining a manifold shape for the action manifold by an initial surface that complies with the at least one physical action limit.

3. The computer-implemented method of claim 1, further comprising:
    calculating a constrained surface that complies with the at least one safety constraint; and
    calculating the deformation from the initial surface to the constrained surface,
    wherein the constrained action is determined based on the deformation.

4. The computer-implemented method of claim 3, further comprising parameterizing the deformation using a B-spline.

5. The computer-implemented method of claim 3, wherein the constrained action is determined relative to a center of the constrained surface.

6. The computer-implemented method of claim 3, wherein the constrained action is determined by multiplying a raw predicted action by the deformation to obtain a product, and adding the product to a center of the constrained surface.

7. The computer-implemented method of claim 3, wherein another area is calculated based on minimizing a deformation area encompassed by the deformation.

8. The computer-implemented method of claim 1, wherein the constrained surface is a domain such that for all points in the domain, a line segment from the center of the domain to any of the points is within the domain.

9. A computer program product for reinforcement learning, the computer program product comprising a non-transitory computer readable storage medium having program instructions embodied therewith, the program instructions executable by a computer to cause the computer to perform a method comprising:
    reading, by a processor device, an action manifold which is described as a n-polytope, at least one physical action limit, and at least one safety constraint;
    updating, by the processor device, the action manifold based on the at least one physical action limit;
    calculating, by the processor device, a new action manifold based on the at least one safety constraint; and
    performing, by the processor device, the reinforcement learning by selecting a constrained action from among a set of constrained actions in the action manifold,
    wherein the constrained action is selected by centering and scaling a raw action predicted by a neural network in the new action manifold, the centering avoiding obstacles in an agent path in the new action manifold, the scaling exploring the new action manifold based on a deformation of the new action manifold relative to the updated action manifold and constrained by upper and lower bounds derived from the at least one physical action limit and the at least one safety constraint, and wherein the new action manifold inputs one or more constraints and a state and outputs the deformation.

10. The computer program product of claim 9, wherein the method further comprises defining a manifold shape for the action manifold by an initial surface that complies with the at least one physical action limit.

11. The computer program product of claim 9, wherein the method further comprises:
  calculating a constrained surface that complies with the at least one safety constraint; and
  calculating the deformation from the initial surface to the constrained surface,
  wherein the constrained action is determined based on the deformation.

12. The computer program product of claim 11, wherein the method further comprises parameterizing the deformation using a B-spline.

13. The computer program product of claim 11, wherein the constrained action is determined relative to a center of the constrained surface.

14. The computer program product of claim 11, wherein the constrained action is determined by multiplying a raw predicted action by the deformation to obtain a product, and adding the product to a center of the constrained surface.

15. The computer program product of claim 11, wherein another area is calculated based on minimizing a deformation area encompassed by the deformation.

16. The computer program product of claim 9, wherein the constrained surface is a domain such that for all points in the domain, a line segment from the center of the domain to any of the points is within the domain.

17. A computer processing system for reinforcement learning, comprising:
  a memory for storing program code; and
  a processor device operatively coupled to the memory for running the program code to
    read an action manifold which is described as a n-polytope, at least one physical action limit, and at least one safety constraint;
    update the action manifold based on the at least one physical action limit;
    calculate a new action manifold based on the at least one safety constraint; and
    perform the reinforcement learning by selecting a constrained action from among a set of constrained actions in the action manifold,
  wherein the constrained action is selected by centering and scaling a raw action predicted by a neural network in the new action manifold, the centering avoiding obstacles in an agent path in the new action manifold, the scaling exploring the new action manifold based on a deformation of the new action manifold relative to the updated action manifold and constrained by upper and lower bounds derived from the at least one physical action limit and the at least one safety constraint, and wherein the new action manifold inputs one or more constraints and a state and outputs the deformation.

* * * * *